United States Patent
Courtier et al.

(10) Patent No.: US 11,174,740 B2
(45) Date of Patent: Nov. 16, 2021

(54) VANE COMPRISING A STRUCTURE MADE OF COMPOSITE MATERIAL AND A METAL STIFFENING PART

(71) Applicant: SAFRAN AIRCRAFT ENGINES, Paris (FR)

(72) Inventors: Vivien Mickaël Courtier, Moissy-Cramayel (FR); Anthony Binder, Moissy-Cramayel (FR); Christophe Paul Jacquemard, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 232 days.

(21) Appl. No.: 16/667,150

(22) Filed: Oct. 29, 2019

(65) Prior Publication Data
US 2020/0182073 A1  Jun. 11, 2020

(30) Foreign Application Priority Data
Oct. 30, 2018 (FR) ...................................... 1860061

(51) Int. Cl.
*F01D 5/30* (2006.01)
*F01D 5/28* (2006.01)
*F01D 17/16* (2006.01)

(52) U.S. Cl.
CPC ........... *F01D 5/3015* (2013.01); *F01D 5/282* (2013.01); *F01D 17/162* (2013.01);
(Continued)

(58) Field of Classification Search
CPC ...... F01D 5/282; F01D 5/3015; F01D 5/3092; F01D 5/323; F05D 2220/323; F05D 2240/80; F05D 2260/30; F05D 2260/74; F05D 2300/603; Y02T 50/60; B29C 70/48; B29L 2031/082; B29D 99/0025; B64C 11/26
See application file for complete search history.

(56) References Cited

U.S. PATENT DOCUMENTS 4,019,832 A * 4/1977 Salemme ................... F01D 5/30
                                                            416/135
4,655,687 A    4/1987 Atkinson
(Continued)

FOREIGN PATENT DOCUMENTS

EP    1 972 757 B1    7/2012
ER    0 764 765 A1    3/1997

OTHER PUBLICATIONS

Communication dated May 22, 2019 from French National Institute of Industrial Property in Application No. 1860061.

*Primary Examiner* — Christopher Verdier
*Assistant Examiner* — Eric A Lange
(74) *Attorney, Agent, or Firm* — Sughrue Mion, PLLC (57) ABSTRACT

The invention relates to a vane (7) comprising:
a structure made of composite material,
a vane (7) root (16) attachment (9) comprising a base having a radial outer face (20) and in which a slot (24) configured to receive the vane (7) root (16) is formed and
two platforms (26), extending on either side of the blade (18) opposite the radial outer face (20), and
two stiffening parts (30), added and fixed on the radial outer face (20) on either side of the stilt (17) so as to tightly abut against the stilt (17).

16 Claims, 4 Drawing Sheets

(52) U.S. Cl.
CPC .... *F05D 2220/323* (2013.01); *F05D 2240/80* (2013.01); *F05D 2260/30* (2013.01); *F05D 2260/74* (2013.01); *F05D 2300/603* (2013.01)

(56) References Cited

U.S. PATENT DOCUMENTS

| | | | | |
|---|---|---|---|---|
| 5,791,877 | A * | 8/1998 | Stenneler | F01D 5/3092 |
| | | | | 416/221 |
| 2009/0269203 | A1* | 10/2009 | Care | F01D 11/008 |
| | | | | 416/221 |
| 2012/0244007 | A1* | 9/2012 | Mason | F04D 29/322 |
| | | | | 416/235 |
| 2013/0052012 | A1* | 2/2013 | Kray | F01D 5/3007 |
| | | | | 416/2 |
| 2015/0247412 | A1 | 9/2015 | Le Hong | |
| 2016/0194971 | A1* | 7/2016 | Yagi | F01D 11/005 |
| | | | | 415/208.1 |
| 2018/0051705 | A1* | 2/2018 | Foster | B29C 70/24 |
| 2018/0111332 | A1* | 4/2018 | Collis | B29C 66/742 |

\* cited by examiner

VANE COMPRISING A STRUCTURE MADE OF COMPOSITE MATERIAL AND A METAL STIFFENING PART

FIELD OF THE INVENTION

The invention relates to a vane comprising a structure made of composite material.

The invention relates more particularly, but not exclusively, to a vane intended to be used in an unducted fan rotor of an aircraft engine (such as an "Open Rotor"-type engine having two rotating propellers or an USF "Unducted Single Fan"-type engine having a movable vane assembly and a stationary vane assembly or a turboprop having a single-propeller architecture) or in a wind turbine rotor.

TECHNOLOGICAL BACKGROUND

The advantage of the unducted fan engines is that the diameter of the fan is not limited by the presence of a fairing, so that it is possible to design an engine having a high bypass ratio, and consequently a reduced fuel consumption.

Thus, in this type of engine, the vanes of the fan can have a large span.

In addition, these engines generally comprise a mechanism that allows changing the pitch angle of the vanes in order to adapt the thrust generated by the fan according to the different phases of flight.

However, the design of such vanes requires taking into account conflicting constraints.

On the one hand, the dimensioning of these vanes must allow optimal aerodynamic performances (maximizing efficiency and providing thrust while minimizing losses). Improved aerodynamic performances of the fan tend to an increased bypass ratio (BPR), which results in an increased outer diameter and therefore an increased span of these vanes.

On the other hand, it is also necessary to guarantee a resistance to the mechanical stresses that may be exerted on these vanes while limiting their acoustic signature.

Furthermore, on the unducted fan architectures, the engine is generally started with a very open pitch. Indeed, a very open pitch enables consumption of the power by the torque, which ensures the safety of the machine while guaranteeing low fan speeds.

However, with a very open pitch, the vanes undergo a turbulent aerodynamic flow, that is completely separated, which generates a broadband vibrational excitation. Especially on wide-chord vanes with large span, the bending force is intense although the engine speed is not maximum.

In normal operation, during the ground and flight phases, the pitch is changed (the pitch angle is more closed). The aerodynamic flow is therefore perfectly non-turbulent (re-adhered to the aerodynamic profile). The broadband loads disappear, the rotational speed is higher, and the bending force is controlled.

Currently, these vanes are generally made of metal material. If the metal material vanes have good mechanical strength, they have the disadvantage of having a relatively significant mass.

In order to reduce this mass, it is desirable to be able to manufacture these composite material vanes. However, the intense aerodynamic forces to which these vanes would be subjected could damage the vane and/or the hub in the interface area between these vanes and the hub of the fan rotor. This problem arises more particularly when the vanes are connected to the hub by means of broached attachments.

SUMMARY OF THE INVENTION

An object of the invention is therefore to propose a vane comprising a structure made of composite material, adapted to be used with a variable-pitch mechanism, while being capable of withstanding intense aerodynamic forces.

For this purpose, the invention proposes a vane, in particular a vane of a rotor of a turbomachine, comprising:
- a structure made of composite material comprising a fiber reinforcement obtained by three-dimensional weaving and a matrix into which the fiber reinforcement is embedded, the composite material structure comprising an airfoil blade, a vane root and a stilt extending between the blade and the vane root,
- a vane root attachment, comprising a base having a radial outer face and in which a slot configured to receive the vane root is formed
- two platforms, extending on either side of the blade opposite the radial outer face and
- two stiffening parts, added and fixed on the radial outer face on either side of the stilt so as to tightly abut against the stilt.

Some preferred but non-limiting characteristics of the vane described above are the following, taken individually or in combination:
- the stiffening parts further abut against a portion of the blade.
- the stiffening parts are made of at least one of the following materials: a steel-based alloy, a titanium-based alloy, a composite material comprising a fiber reinforcement densified by a matrix.
- each stiffening part has a thickness comprised between 4 mm and 6 mm when the stiffening parts are made of titanium-based alloy or of composite material and between 2 mm and 3 mm when the stiffening parts are made of steel-based alloy.
- a recess is formed in the radial outer face of the attachment on either side of the stilt so as to form two shoulders, and in which each shoulder is configured to receive one of the stiffening parts, a depth of the shoulder being substantially equal to a thickness of the associated stiffening part at the radial outer face.
- each stiffening part further extends between one of the platforms and the stilt, a gasket being able to be positioned between the stiffening part and the associated platform, where each stiffening part is monolithic with one of the platforms.
- the vane further comprises a series of screws added and fixed in associated orifices formed in each stiffening part and in the radial outer face of the attachment.
- the vane has a reduced thickness in the areas in contact with the stiffening parts so that a thickness of the vane at the free end of said stiffening parts is substantially continuous.
- the vane further comprises a damping gasket, positioned between a free edge of each stiffening part and the vane.
- the vane has a leading edge and a trailing edge and a radial portion of each stiffening part has a thinned edge at the leading edge and/or at the trailing edge.

BRIEF DESCRIPTION OF THE DRAWINGS

Other characteristics, objects and advantages of the present invention will become more apparent upon reading the following detailed description, and in relation to the appended drawings given by way of non-limiting examples and in which.

DETAILED DESCRIPTION OF ONE EMBODIMENT

Figure 1:
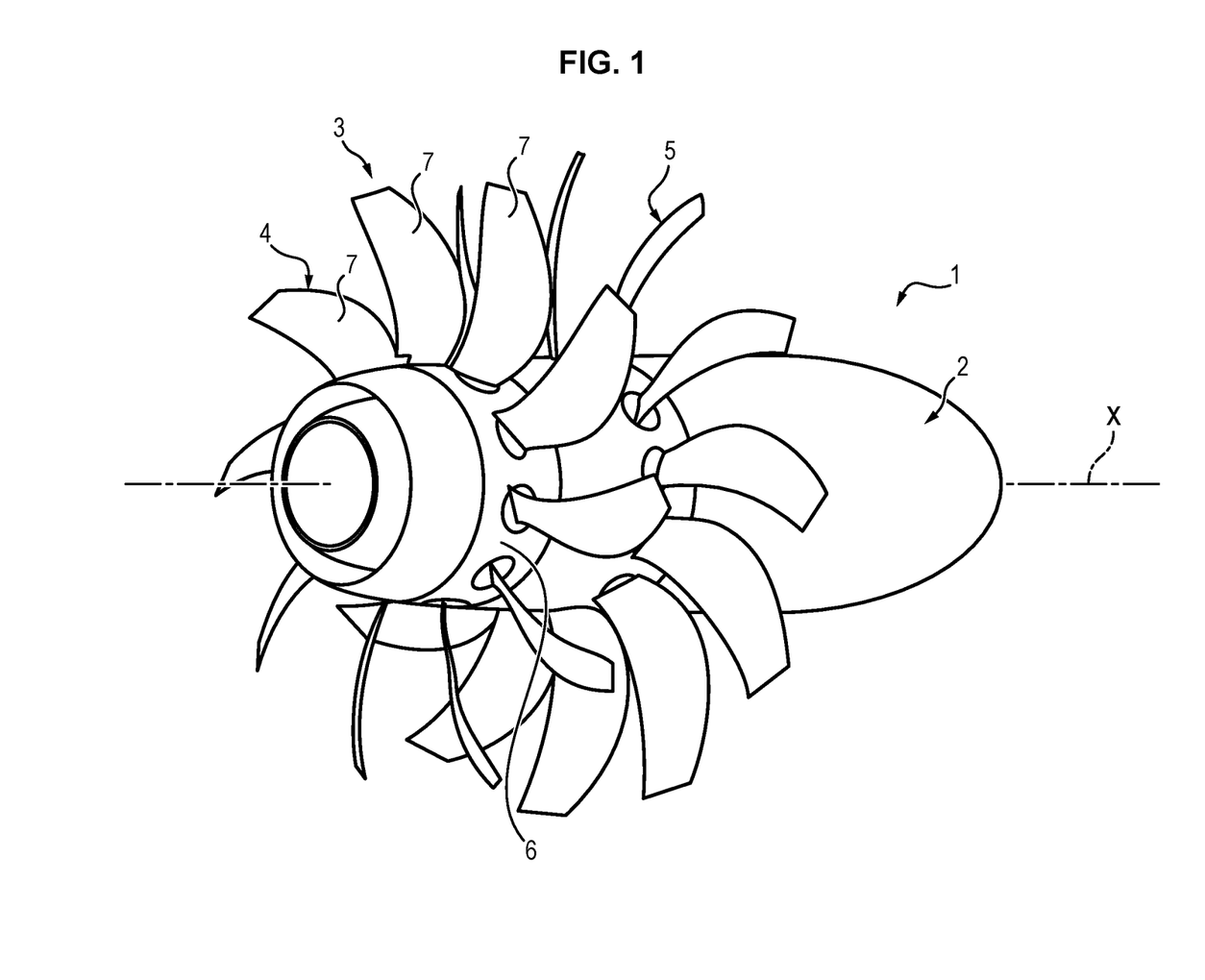
FIG. 1 schematically represents one example of an engine including an unducted fan.

In FIG. 1, the engine 1 represented is an "Open Rotor"-type engine, in a configuration commonly referred to as "pusher" (i.e. the fan is placed at the rear of the power generator with an air inlet located on the side, to the right in FIG. 1).

The engine comprises a nacelle 2 intended to be fixed to a fuselage of an aircraft, and an unducted fan 3. The fan 3 comprises two counter-rotating fan rotors 4 and 5. In other words, when the engine 1 is in operation, the rotors 4 and 5 are driven in rotation relative to the nacelle 2 about the same axis of rotation X (which coincides with a main axis of the engine), in opposite directions.

In the example illustrated in FIG. 1, the engine is an "Open Rotor"-type engine, in "pusher" configuration, with counter-rotating fan rotors. However, the invention is not limited to this configuration. The invention also applies to "Open Rotor"-type engines, in "puller" configuration (i.e. the fan is placed upstream of the power generator with an air inlet located before, between or just behind the two fan rotors).

In addition, the invention also applies to engines having different architectures, such as an architecture comprising a fan rotor comprising movable vanes and a fan stator comprising stationary vanes, or a single fan rotor.

The invention is applicable to turboprop-type architectures (comprising a single fan rotor).

In FIG. 1, each fan rotor 4, 5 comprises a hub 6 rotatably mounted relative to the nacelle 2 and a plurality of vanes 7 fixed to the hub 6. The vanes 7 extend substantially radially relative to the axis rotation X of the hub.

In the present application, the upstream and the downstream are defined relative to the direction of normal flow of the gas in the rotor 4, 5 and through the turbomachine. Moreover, the axis X of the rotor 4, 5 is its axis of rotation. The axial direction corresponds to the direction of the axis X and a radial direction is a direction perpendicular to this axis and passing therethrough. Moreover, the circumferential direction corresponds to a direction perpendicular to the axis X and not passing therethrough. Unless otherwise specified, the terms "inner" and "outer", respectively, are used with reference to a radial direction so that the inner portion or face of an element is closer to the axis X than the outer portion or face of the same element.

Figure 2:
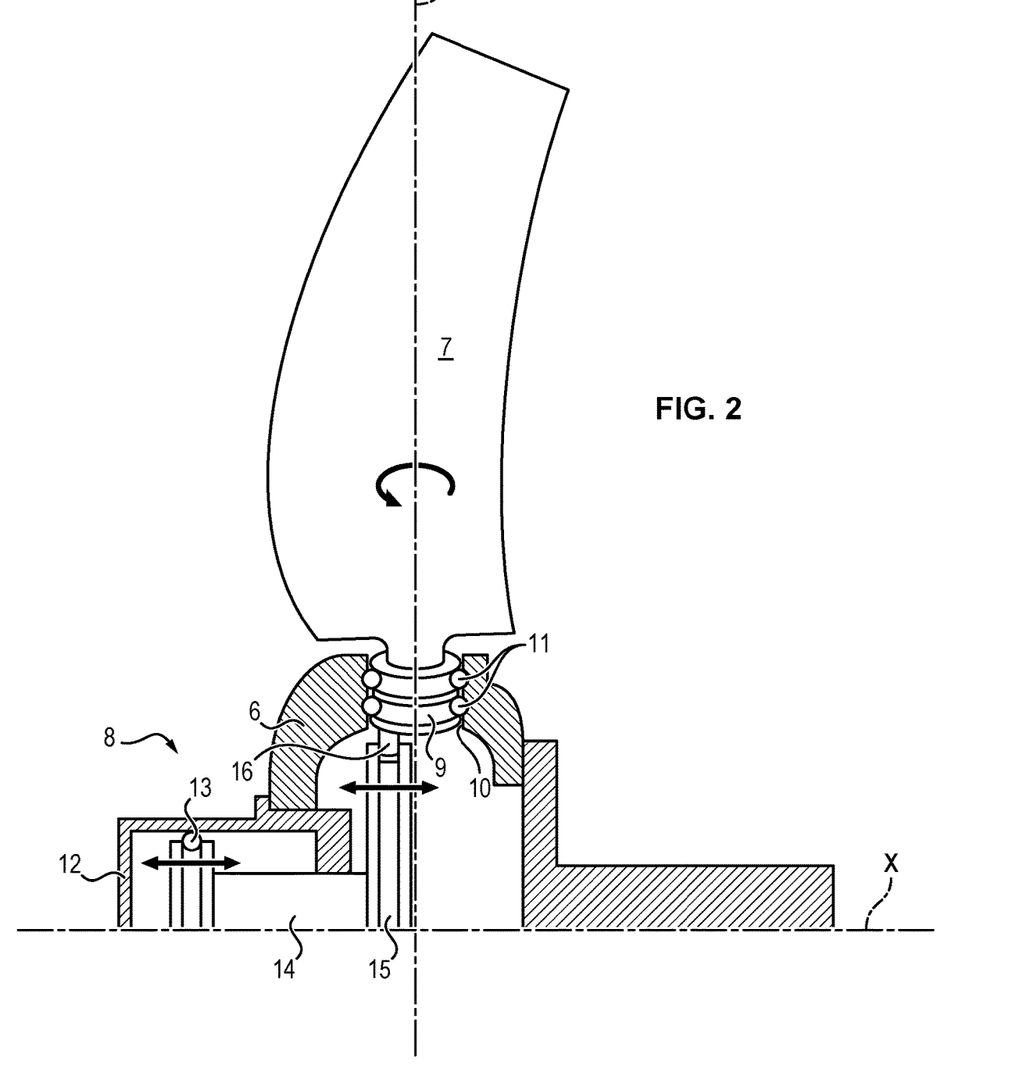
FIG. 2 schematically represents a fan vane and an actuating mechanism that allows changing the pitch angle of the vanes of the fan.

As illustrated in FIG. 2, the fan 3 further comprises an actuating mechanism 8 for collectively changing the pitch angle of the vanes of the rotors, in order to adapt the performances of the engine to the different phases of flight.

For this purpose, each vane 7 comprises an attachment part 9 disposed at the vane root. The attachment part 9 is rotatably mounted relative to the hub 6 about a pitch axis Y. More specifically, the attachment part 9 is rotatably mounted inside a housing 10 arranged in the hub 6, by means of balls 11 or other rolling elements.

The actuating mechanism 8 comprises an actuator 12 comprising a body 13 fixed to the hub 6 and a rod 14 adapted to be driven in translation relative to the body 12. The actuating mechanism 8 further comprises an annular slide 15 mounted secured to the rod 14 and a pin 16 mounted secured to the attachment part 9. The pin 16 is adapted to slide in the slide 15 and to rotate relative to the slide 15, so as to convert a translational movement of the rod 14 into a rotational movement of the attachment part 9, and consequently a rotational movement of the vane 7 relative to the hub 6 about its pitch axis Y.

The vane 7 is a structure made of composite material comprising a fiber reinforcement obtained by three-dimensional weaving and a matrix into which the fiber reinforcement is embedded. This composite material structure comprises a root 16, a stilt 17 and an airfoil blade 18.

The fiber reinforcement can be formed from a one-piece fiber preform obtained by three-dimensional or multilayer weaving with progressive thickness. It can in particular comprise carbon, glass, aramid and/or ceramic fibers. The matrix for its part is typically a polymer matrix, for example epoxide, bismaleimide or polyimide or a carbon matrix. The vane 1 is then formed by molding by means of a vacuum resin injection process of the RTM ("Resin Transfer Molding") or VARRTM ("Vacuum Resin Transfer Molding") type.

Each housing 10 receives a pivoting attachment 9 of a vane 7. The root 16 of the vane 7 is retained in the attachment 9, the stilt 17 and the blade 18 extending out of the hub 6. The attachment 9 comprises, in a manner known per se, a base having a radial outer face 20 and two symmetrical and inclined opposite flanks 22 delimiting a broaching slot 24 in which the root 16 of the vane 7 is retained. The root 16 is generally wider than the rest of the blade 18. The flanks 22 are therefore inclined towards each other and form bearings.

The attachment 9 can be made, conventionally, of steel or titanium.

Two platforms 26 are further fixed on the attachment 9 on either side of the blade 18 and cover the slot 24 so as to reconstitute the stream of the rotor 4, 5. The platforms 26 can be made either of composite material or of metal.

As indicated above, the root portion 16 of the vane 7 is intended to allow the attachment of the vane 7 to the attachment 9 and extends for this purpose between the bottom of the slot 24 and the outlet of the bearings. The airfoil blade 18 portion is for its part adapted to be placed in an airflow, when the engine is in operation, in order to generate a lift. Finally, the stilt 17 corresponds to the area of the blade 18 which extends between the root 16 and the blade 18 that is to say between the outlet of the bearings and the platforms 26.

The vane 7 further comprises two stiffening parts 30, added and fixed on the radial outer face 20 of the attachment 9, on either side of the stilt 17, so as to tightly abut against the stilt 17 and, optionally, a portion 18a of the blade.

The stiffening parts 30 are metallic, for example in a titanium-based alloy or a steel-based alloy, or made of a very stiff composite material, so as to stiffen the root 16 of the vane 7 above the bearings and thus limit the displacements induced by the bending vibrations of the vane 7. Therefore, they act as a support taking up the intense forces coming from the aerodynamics when the flow is separated (for example in the case where the pitch angle is very open, as at startup). Thus, the stiffening part 30 is based on a material stiffer than the root 16 of the vane 7 and stiffer than the attachment 9 which is typically made of titanium. The stiffening part 30 may be made of titanium-based material but more preferably of steel-based material (200 GPa characteristic) to be thinner. Alternatively, the stiffening part 30 may be made of a composite-based material having a fiber reinforcement densified by a matrix (characteristic 200 GPa), for example of a laminate-based material, with the strips of the plies of the laminate being predominantly in radial orientation (in the direction of the section). Plies with weaving orientation at 45 degrees with respect to the radially oriented plies are provided in the laminate as complements to the radially oriented plies.

For this purpose, each stiffening part 30 comprises a circumferential portion 32 configured to be in surface abutment against the radial outer face 20 of the attachment 9 and a radial portion 34 configured to be in surface abutment against the stilt 17 and, where appropriate, a portion 18a of the blade. The circumferential portion 32 and the radial portion 34 are monolithic and connected to each other via a curved junction portion 36.

Preferably, in order to prevent swiveling of the root 16 of the vane 7, a height h of the radial portion 34 of each stiffening part 30 is comprised between 5% and 25% of the height of the vane 7, preferably between 8% and 15% of said height, for example in the order of 10%. By height of the vane 7, it will be understood here the dimension along an axis radial to the axis of the rotor 4, 5 between the lower limit of the stilt 17 and the radial outer end of the blade 18 (that is, to say the tip of vane 7).

In addition, the height h of the radial portion 34 can be adapted to modify the frequency placement of some frequency modes of the vane 7, which further allows avoiding possible frequency crossings over the range of use of the rotor 4, 5.

Figure 4:
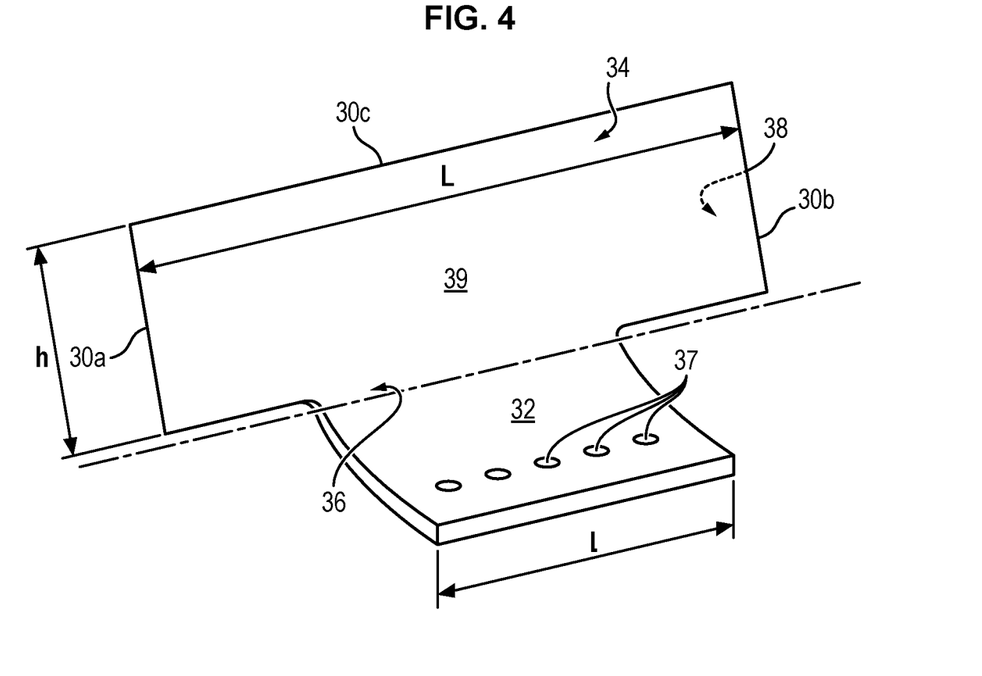
FIG. 4 is a perspective view of one exemplary embodiment of a stiffening part that can be used in a vane according to the invention.
Figure 5:
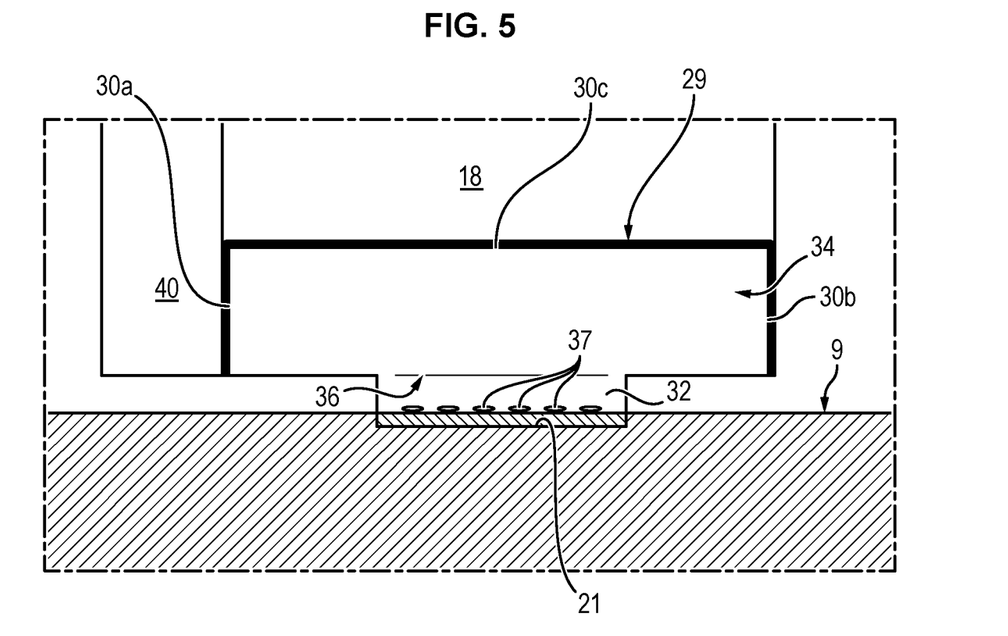
FIG. 5 is a schematic partial sectional side view of one example of a vane fixed in an associated attachment.

The curvature of the joining portion 36 is for its part dimensioned so as to optimally take up the forces coming from the vane 7 and to transmit them to the circumferential portion 32.

Where appropriate, as shown in FIGS. 4 and 5, an axial width L of the circumferential portion 32 may be greater than an axial width 1 of the radial portion 34. In other words, the circumferential portion 32 may not expand over the entire chord of the vane 7.

Each stiffening part 30 further has an inner face 38, which extends opposite the radial outer face 20 and the stilt 17, and an outer face 39 which is opposite to the inner face 38, as well as a thickness e which corresponds to the minimum distance between the inner face 38 and the outer face 39 in the circumferential portion 32.

The thickness e of each stiffening part 30 is comprised between 4 mm and 6 mm when it is made of titanium-based alloy or of composite material and between 2 mm and 3 mm when it is made of steel-based alloy.

In order to assemble the fan rotor 4, 5, for each attachment 9 and each vane 7, a shim 19 may, in a conventional manner, be mounted in the bottom of the slot 24. The root 16 of the vane 7 may then, be inserted over the shim 19. Then, the stiffening parts 30 are added on the attachment 9 by inserting them radially on either side of the vane 7 and fixed in this position. For this purpose, a first and a second series of orifices 37 are respectively formed in the circumferential portion 32 of the stiffening parts 30 and in the radial outer face 20, on either side of the slot 24, each second orifice 37 extending opposite a first orifice, and a series of screws are added and fixed in each first and second orifice 37 so as to block the stiffening parts 30 relative to the attachment 9. Preferably, bushings, configured to cooperate with the screws, are further provided in the second orifices 37. The screws thus allow ensuring the resistance of the vane 7 to centrifugal forces.

It will be noted that the position of the second orifices 37 relative to the slot 24, and therefore to the vane 7, is chosen so that the radial portion 34 of the stiffening parts 30 is tightly mounted against the stilt 17 (and, where appropriate, a portion of the blade 18) over its entire inner face 38. In other words, the radial portions 32 exert a force on the vane 7 when stopped and during all phases of flight. It is this tight surface contact that allows stiffening the vane 7 by adding additional abutment points at a distance from the attachment 9. The stiffening parts 30 are therefore not adhered to the vane 7, thus allowing small relative movements between said stiffening parts 30 and the vane 7 in operation.

Figure 3:
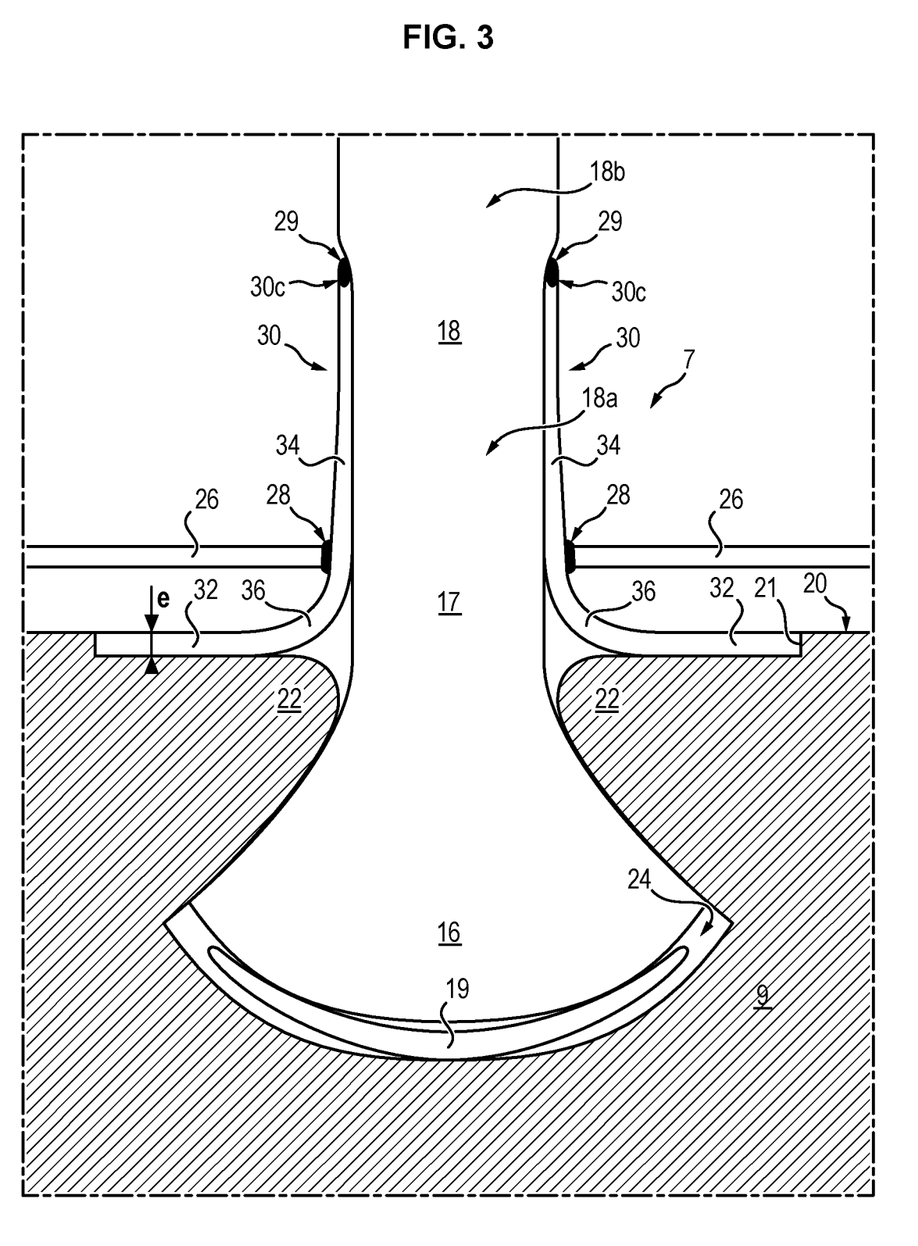
FIG. 3 is a schematic partial sectional view of one example of a vane according to one embodiment of the invention.

The platforms 26 are then added and fixed on the attachment 9 or the hub in a conventional manner. As can be seen in FIG. 3, in one embodiment, the radial portion 34 of each stiffening part 30 extends between one of the platforms 26 and the stilt 17. A gasket 28 can then be positioned between the stiffening part 30 and the associated platform 26 so as to ensure continuous contact between the platform 26 and the stiffening parts 30 and thus limit the risks of air leaks from the stream toward the hub and therefore the aerodynamic losses. The gasket 28 may for example be fixed on the ridge of the platforms 26 which abuts against the stilt 17.

Alternatively, each platform 26 may be monolithic with one of the stiffening parts 30. The platforms 26 are then formed integrally and in one piece with the associated stiffening part 30, or added and fixed thereon. In this variant, the platforms 26 are therefore fixed on the attachment 9 with the stiffening parts 30.

Where appropriate, two recesses 21, each configured to accommodate the circumferential portion 32 of one of the stiffening parts 30, may be formed in the radial outer face 20 of the attachment 9, on either side of the stilt 17. These recesses 21 thus form shoulders that open into the slot 24 and allow taking up the forces coming from the vane 7.

The recesses 21 may be obtained by machining the radial outer face 20 of the attachment 9, or alternatively during the molding of the attachment 9.

Optionally, a depth (which corresponds here to the dimension along an axis normal to the radial outer face 20) of the shoulder is substantially equal to the thickness e of the circumferential portion 32 of the stiffening part 30 at the shoulder, so as to reconstitute a smooth surface at the radial outer face 20.

Where appropriate, a damping gasket 29 may be positioned between a free edge of each stiffening part 30 and the vane 7 in order to ensure continuous contact between the stiffening part 30 and the vane 7 despite possible small deformations and thus limit the appearance of clearances. This damping gasket 29 thus allows limiting the aerodynamic losses likely to reduce the efficiency of the rotor 4, 5.

For example, the damping gasket 29 can be added and fixed in a groove formed in the inner face 38 of each stiffening part 30.

The damping gasket 29 may for example be fixed on the radial outer edge 30c, on the upstream edge 30a and on the downstream edge 30b of the radial portion 34 of each stiffening part 30.

In one embodiment, when the stiffening parts 30 partially cover the blade 18, which extends into the gas flow in operation, the vane 7 has a reduced thickness in the portion 18a of the vane which is in contact with the stiffening parts 30 and at the stilt 17, so that a thickness of the vane 7 at the free end of said stiffening parts 30 is substantially continuous. In other words, the thickness of this portion 18a of the blade and of the stilt 17 is reduced so that, when the stiffening parts 30 are added and fixed on the vane 7, the latter has a continuous aerodynamic surface, that is to say devoid of protruding ridge, so as not to generate aerodynamic losses likely to reduce the efficiency of the rotor 4, 5.

For this purpose, the composite material structure may be joggled at the interface between the vane 7 and the stiffening parts 30. For example, during the weaving of the fiber preform, the weft strands can be chosen so that those forming the stilt 17 and the portion 18a of the blade have a smaller diameter than those forming the rest 18b of the blade 18. The number of warp strands may not be modified compared to a conventional vane 7.

Alternatively, additional warp strands may be introduced during weaving of the fiber preform in the areas 18b of the blade 18 which are not intended to be covered by the stiffening parts 30. This embodiment slightly increases the thickness of the vane 7 at its aerodynamic surface, compared to the first variant which allows maintaining its nominal thickness. Warp strands are added but for their maintenance, these weft strands are also added.

According to yet another variant, the composite material structure can be both joggled and additional warp and weft strands can be introduced during weaving of the fiber preform.

Thus, for these two variants, strands are woven, including areas with free weaving spaces, leaving weaving-"float" areas. Non-woven (or loosely woven) spaces are located between tightly woven spaces.

The added warp strands will allow getting thickness and the weft strands will ensure the maintenance. In addition, thickness variations are possible without weaving pattern variation, only by the action of changing the spacing between the strands.

It will be noted that, in the case where the stiffening parts 30 are made of a material whose stiffness is in the order of that of the composite material of the vane 7 (in the direction of the warp yarns of the fiber preform), for example when they are in a titanium alloy or in a composite material, the root 16 cutouts are slightly refined, which makes it possible to guarantee a gain in stiffness since the stiffening parts 30 cover the lower portion of the vane 7.

In the case where the stiffening parts 30 are in a material whose stiffness is greater than that of the composite material of the vane 7 (in the direction of the warp yarns of the fiber preform), for example when they are in a steel-based alloy, the root 16 cutouts can be refined while increasing the stiffness of the vane 7, which is beneficial for the efficiency of the rotor 4, 5.

When necessary, the vane 7 may further comprise a metal structural shield 40 added and fixed on the leading edge and/or on the trailing edge of the vane 7. By leading edge, it will be understood here the edge of the vane 7 configured to extend opposite the flow of the gases entering the rotor 4, 5. It corresponds to the anterior portion of the aerodynamic profile which faces the air stream and which divides the air flow into an intrados flow and an extrados flow. The trailing edge for its part corresponds to the posterior portion of the aerodynamic profile, where the intrados and extrados flows meet.

When the stiffening parts 30 cover a portion 18a of the blade (and therefore extend beyond the platforms 26, in the stream), said parts are positioned on the blade 18 so as to extend in the extension of said structural shield 40, without overlapping. The structural shield(s) 40 and the stiffening parts 30 are further disposed end-to-end so that the portion 18a of the blade is covered either by the structural shield 40 or by a stiffening part 30, between its leading edge and its trailing edge, so that the surface of the vane 7 does not have a discontinuity likely to disturb the flow.

Alternatively, when the vane 7 is devoid of structural shield, the upstream edge 30a and the downstream edge 30b of the stiffening part, which cover the intrados (or the extrados) of each stiffening part 30 at the leading edge and trailing edge of the vane 7 are thinned. The thinning is for example carried out by joggling in the direction of the weft strands of the fiber preform, in the area intended to form these edges 30a, 30b.

The invention claimed is:

1. A vane of a turbomachine, the vane comprising:
a structure made of composite material comprising a fiber reinforcement obtained by three-dimensional weaving and a matrix into which the fiber reinforcement is embedded, the composite material structure comprising an airfoil blade, a vane root and a stilt extending between the blade and vane root,
a vane root attachment, comprising a base having a radial outer face and in which a slot configured to receive the vane root is formed
two platforms, extending on either side of the blade opposite the radial outer face, and
two stiffening parts, added and fixed on the radial outer face on either side of the stilt so as to abut against the stilt,
wherein the vane has a reduced thickness in the areas in contact with the stiffening parts so that a thickness of the vane at a free end of said stiffening parts is continuous.

2. The vane according to claim 1, wherein the stiffening parts further abut against a portion of the blade.

3. The vane according to claim 1, wherein the stiffening parts are made of at least one of the following materials: a steel-based alloy, a titanium-based alloy, a composite material comprising a fiber reinforcement densified by a matrix.

4. The vane according to claim 3, wherein each stiffening part has a thickness comprised between 4 mm and 6 mm when the stiffening parts are made of titanium-based alloy or of composite material and between 2 mm and 3 mm when the stiffening parts are made of steel-based alloy.

5. The vane according to claim 1, wherein a recess is formed in the radial outer face of the attachment on either side of the stilt so as to form two shoulders, and wherein each shoulder is configured to receive one of the stiffening parts, a depth of the shoulder being equal to a thickness of the associated stiffening part at the radial outer face.

6. The vane according to claim 1, wherein each stiffening part further extends between one of the platforms and the stilt, a gasket being positionable between the stiffening part and the associated platform.

7. The vane according to claim 1 wherein each stiffening part is monolithic with one of the platforms.

8. The vane according to claim 1, further comprising a series of screws added and fixed in associated orifices formed in each stiffening part and in the radial outer face of the attachment.

9. The vane according to claim 1 further comprising a damping gasket positioned between a free edge of each stiffening part and the vane.

10. The vane according to claim 1 having a leading edge and a trailing edge and wherein a radial portion of each stiffening part has a thinned edge at least at one among the leading edge and the trailing edge.

11. A vane of a turbomachine comprising:
a structure made of composite material comprising a fiber reinforcement obtained by three-dimensional weaving and a matrix into which the fiber reinforcement is embedded, the composite material structure comprising an airfoil blade, a vane root and a stilt extending between the blade and the vane root,
a vane root attachment, comprising a base having a radial outer face and in which a slot configured to receive the vane root is formed and
two platforms, extending on either side of the blade opposite the radial outer face, and
two stiffening parts, added and fixed on the radial outer face on either side of the stilt so as to abut against the stilt and against a portion of the blade,
wherein a height h of a radial portion of each stiffening part is comprised between 5% and 25% of a height of the vane.

12. The vane according to claim 11, wherein the height h of the radial portion of each stiffening part is comprised between 8% and 15% of the height of the vane.

13. The vane according to claim 11, wherein the height h of the radial portion of each stiffening part is equal to 10% of the height of the vane.

14. A vane of a turbomachine, the vane comprising:
a structure made of composite material comprising a fiber reinforcement obtained by three-dimensional weaving and a matrix into which the fiber reinforcement is embedded, the composite material structure comprising an airfoil blade, a vane root and a stilt extending between the blade and the vane root,
a vane root attachment, comprising a base having a radial outer face and in which a slot configured to receive the vane root is formed and
two platforms, extending on either side of the blade opposite the radial outer face, and
two stiffening parts, added and fixed on the radial outer face on either side of the stilt so as to abut against the stilt and against a portion of the blade,
wherein the vane has a reduced thickness in areas in contact with the stiffening parts so that a thickness of the vane at a free end of said stiffening parts is continuous.

15. A vane of a turbomachine comprising:
a structure made of composite material comprising a fiber reinforcement obtained by three-dimensional weaving and a matrix into which the fiber reinforcement is embedded, the composite material structure comprising an airfoil blade, a vane root and a stilt extending between the blade and the vane root,
a vane root attachment, comprising a base having a radial outer face and in which a slot configured to receive the vane root is formed, and
two platforms, extending on either side of the blade opposite the radial outer face,
two stiffening parts, added and fixed on the radial outer face on either side of the stilt so as to abut against the stilt, and
at least one metal structural shield added and fixed on a leading edge of the vane and/or on a trailing edge of the vane,
the stiffening parts therefore extending beyond the platforms and being positioned on a portion of the blade so as to be aligned with said structural shield,
wherein the stiffening parts and the at least one structural shield extend end-to-end, without overlapping.

16. The vane according to claim 15, wherein the at least one structural shield and the stiffening parts cover an entire portion of the blade between the leading edge and the trailing edge so that a surface of said portion of the blade does not have a discontinuity likely to disturb the flow.

\* \* \* \* \*